United States Patent [19]

Rieben

[11] 4,454,790
[45] Jun. 19, 1984

[54] BOLT STRETCH MEASUREMENT DEVICE

[75] Inventor: Stuart L. Rieben, Pittsburgh, Pa.

[73] Assignee: Westinghouse Electric Corp., Pittsburgh, Pa.

[21] Appl. No.: 373,596

[22] Filed: Apr. 30, 1982

[51] Int. Cl.³ .................... B25B 29/02; F16B 31/02
[52] U.S. Cl. ................................ 81/57.38; 73/761; 81/470
[58] Field of Search ............... 81/57.38, 467, 469, 81/470, 472; 73/761, 779; 254/29 A

[56] References Cited

U.S. PATENT DOCUMENTS

| | | | |
|---|---|---|---|
| 3,722,332 | 3/1973 | Jones | 81/57.38 |
| 3,759,090 | 9/1973 | McFaul et al. | |
| 3,837,694 | 9/1974 | Frisch et al. | |
| 3,877,326 | 4/1975 | Köck et al. | 81/57.38 |
| 3,943,819 | 7/1976 | Charron | 73/761 X |
| 3,969,810 | 7/1976 | Pagano | |
| 3,969,960 | 7/1976 | Pagano | |
| 4,062,227 | 12/1977 | Heyman | |
| 4,185,505 | 1/1980 | Exner et al. | 81/57.38 X |

Primary Examiner—Frederick R. Schmidt
Assistant Examiner—Debra S. Meislin
Attorney, Agent, or Firm—R. P. Lenart

[57] ABSTRACT

An apparatus for measuring mechanical strain in a bolt, stud or other tensile member includes a measuring rod which is held in a fixed position with respect to a selected point in an axial bore in the tensile member being measured. A bolt extension tube extends into the axial bore to provide a wrench support function and is held in a fixed position with respect to a second point on the tensile member. Straining the tensile member results in a relative displacement between the rod and the tube which is proportional to tensile member elongation. Means are provided for setting a preselected strain, measuring strain, displaying strain and providing a control signal to control straining of the tensile member.

11 Claims, 3 Drawing Figures

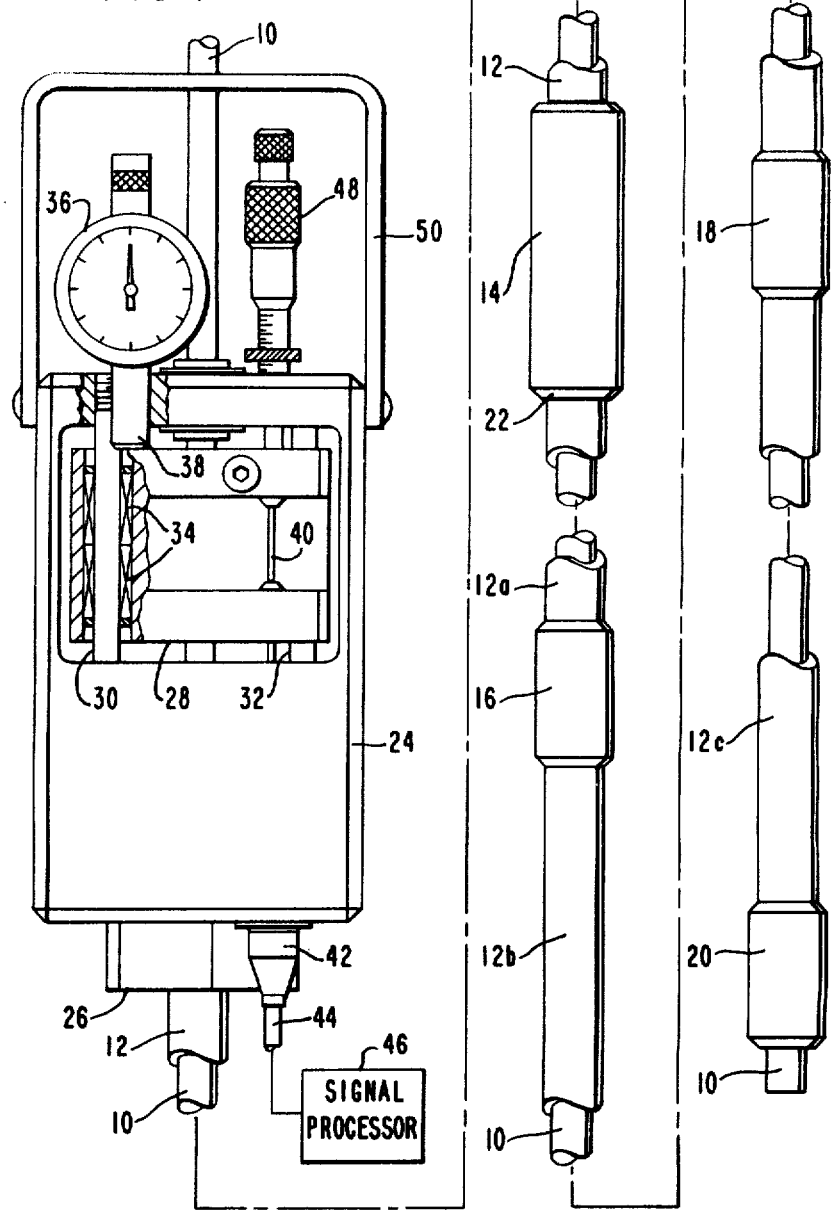

BOLT STRETCH MEASUREMENT DEVICE

BACKGROUND AND SUMMARY OF THE INVENTION

This invention relates to devices which measure mechanical strain and more particularly to devices which measure mechanical strain in bolts or studs.

The proper assembly of bolted joints on high pressure devices such as turbine housings requires high clamping forces at the bolted joints. For example, certain turbine assembly clamp bolts must be pre-stressed to approximately 45,000 psi for adequate clamping force. This is equivalent to an increase in length of 0.0015 inches per inch of effective bolt length.

Three basic methods can be used to measure bolt strain or elongation when a standard hydraulic wrench is used for tightening. These methods are the heating method, torque method and direct measurement method.

In the heating method, a heating rod is inserted into a central axial hole in the bolt. Then the bolt is heated until a specific thermal expansion is achieved. At that time a nut can be tightened snugly and the bolt is allowed to cool. The time required to heat each bolt is long and heater reliability is low. Many heater sizes are required to accommodate the various bolt lengths and bolt sizes.

In the torque method, bolts are tightened to a specific torque which has been calculated or experimentally determined to equate to the desired elongation. However, this does not provide for direct control over bolt tension and is unacceptable where bolt tension is critical.

A variation of the torque method involves pretorquing a nut to seat it on the housing, then the nut is rotated through predetermined degrees of rotation, using the bolt threads as a micrometer. The bolt is stretched a predetermined amount corresponding to a specific tension. This method requires a specially designed wrench with precision instrumentation to control the degrees of rotation. Therefore, it is too complex for many applications.

A second variation of the torque method involves the simultaneous monitoring of torque rate and degrees of rotation. The control scheme for this method depends on detection of the bolt yield point, making it undesirable for stress levels below the yield stress.

Direct measurement of the change in bolt length during tightening can be accomplished in several ways. Ultrasonic techniques can be employed, using either a pulse echo or standing wave method. These methods are relatively complex, require a certain degree of operator skill and are subject to transducer mounting problems.

Built-in measuring rods which are located within the central bore of the bolt have been suggested. Bolt elongation would be determined by examining the amount of rod protruding from the end of the bolt or by measuring the location of the end of the rod using an eddy current technique. Each of these methods requires a special bolt with a built-in rod.

Measuring rods have been used in conjunction with conventional depth micrometers to measure bolt length. This method requires that an initial measurement be taken. Then the bolt is tightened and the wrench is removed so that a second measurement can be taken. This method is rather slow due to the necessity of removing the wrench to make repeated measurements. Nut rotation can be observed on the first few bolts, then nut rotation is used for subsequent bolts. Consistency suffers when this method is used.

U.S. Pat. No. 3,943,819 issued Mar. 16, 1976 to Charron, discloses a direct-reading tension-indicating device. The device includes a tubular sleeve and a test rod which extend coaxially into the bore of the bolt being measured. The sleeve and rod are secured at longitudinally spaced positions within the bolt. Both the sleeve and the rod have a free end adjacent to the open end of the bore. Tensile stress within the intermediate region of the body of the bolt is measured by measuring relative longitudinal displacement between the end faces of the sleeve and rod at their free ends. U.S. Pat. No. 3,877,326 issued Apr. 15, 1975 to Köck et al., and U.S. Pat. No. 3,837,694 issued Sept. 24, 1974 to Frisch et al., both disclose bolt tensioning devices which include continuous display of bolt elongation. Each device utilizes a measuring rod which extends into a bore of the bolt being stressed. Bolt elongation is then determined by measuring the displacement between the end of this measuring rod and the top of a bolt or a bolt extension assembly. In the devices disclosed in each of the three cited patents, the end of the measuring or test rod within the bolt bore is used as a reference point for determining bolt elongation. Therefore, the length of the measuring or test rod is specific to the particular bolt and/or tensioning apparatus being used.

The present invention provides a bolt stretch measurement device which utilizes a measuring rod, the length of which is independent of the bolt being measured. Therefore, bolts and studs of various lengths can be measured with the same instrument. A bolt strain measurement device constructed in accordance with the present invention includes a bolt extension tube which makes contact with the bolt being measured at a point near one end of the bolt. The bolt extension tube extends into a central bore of the bolt being measured to provide support for the measurement device during tightening of the bolt. A coaxial measuring rod extends through the bolt extension tube into the central bore in the bolt being measured and comes in contact with the bolt at a point near the opposite end of the bolt. A slide assembly is slidably disposed along the measuring rod and capable of being clamped to a point on the measuring rod above the end of the bolt extension tube. When the bolt is strained by tightening, the bolt extension tube will move with respect to the measuring rod. With the slide assembly clamped, displacement between the slide assembly and the bolt extension tube will be proportional to bolt elongation. Means for measuring this displacement is provided and can supply a signal for a display of the displacement value or for control of the bolt tightening mechanism.

BRIEF DESCRIPTION OF THE DRAWINGS

FIG. 1 is a plan view of a bolt stretch measurement device in accordance with one embodiment of the present invention;

DESCRIPTION OF THE PREFERRED EMBODIMENTS

Figure 3:
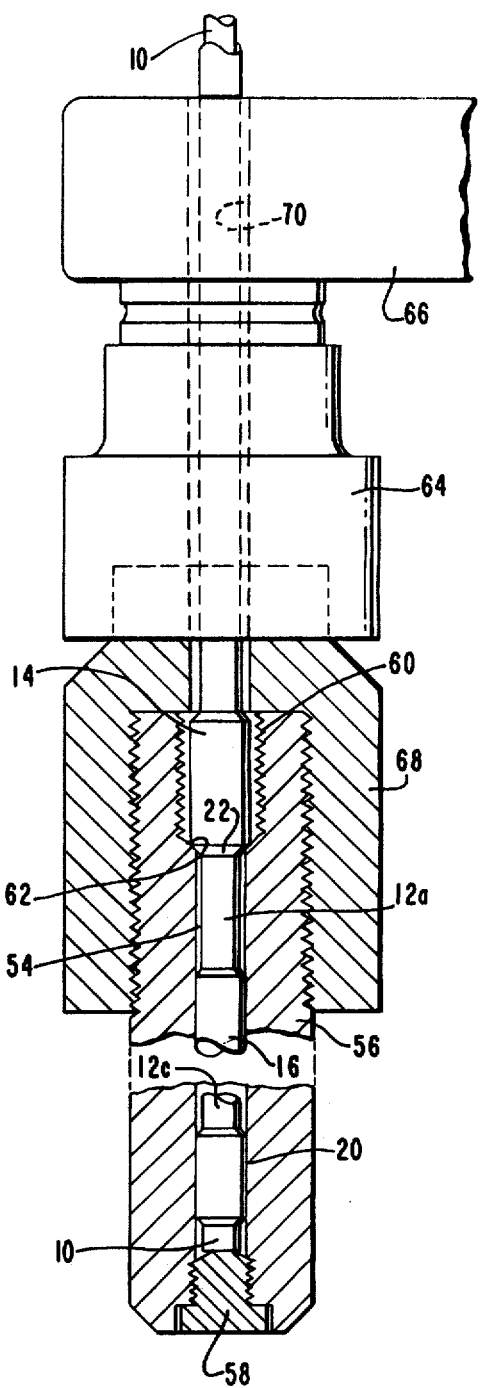
FIG. 3 is a partial cross-sectional view of a bolt with a wrench and the measurement device of FIG. 1 in place.

Referring to the drawings, FIG. 1 shows a bolt stretch measurement device in accordance with one embodiment of the present invention with measuring rod 10 extending coaxially through bolt extension tube 12. Several bolt extension tube segments 12a, 12b and 12c are illustrated to show that the length of bolt extension tube 12 may be varied to accommodate the measurement of bolts of various lengths. These segments are attached by means of couplers 16 and 18. The bolt extension tube serves to guide and center the measuring rod and also serves as a wrench support. Enlarged section 20 at the end of the measuring rod acts as a centering and stabilizing sleeve. The bolt extension tube has an enlarged section 14 which is sized to be a clearance fit in tapped hole in the bolt being measured and includes a beveled surface 22. When a measurement is being made, enlarged section 14 bottoms in the threaded end of the bolt with contact being made along beveled surface 22. This contact point serves as a reference point for the measurement of displacement between the measuring rod and the bolt extension tube. Bolt extension tube segments 12a, 12b and 12c extend into the central bore of the bolt being measured. Couplers 16 and 18 are sized to be a clearance fit in the bolt bore. Due to this fit and the fit of section 14, the bolt extension tube is sufficiently rigid to support an hydraulic wrench, thereby making the measuring during tightening concept workable. Measuring rod 10 continues into the bore of the bolt being measured and comes in contact with a second point near the lower end of the bolt.

An instrument housing 24 is attached to the end of bolt extension tube 12 by way of clamp 26. Measuring rod 10 extends through instrument housing 24. Slide assembly 28 is located within instrument housing 24 and slidably disposed on measuring rod 10. A clamp, not shown in this view, is provided as a means for attaching slide 28 to measuring rod 10. Two shafts 30 and 32 pass through slide assembly 28. Bearings 34 allow linear movement of slide assembly 28 along shafts 30 and 32. Dial gage 36 is permanently attached to instrument housing 24 and includes measurement shaft 38 which is in contact with slide assembly 28. Relative displacement between slide assembly 28 and instrument housing 24 appears on dial gage 36 which serves as a means for continuously reading out bolt elongation.

A continuous electronic measurement of bolt elongation is provided by a linear variable differential transformer (LVDT) 40, which is connected by way of connector 42 to cable 44. It transmits a signal by way of cable 44 to signal processor 46. The signal processor includes means for pre-setting a desired bolt elongation; provides a continuous readout of bolt elongation; and also can serve as a control means to control the actuation of the bolt tensioning wrench and stop the wrench action when the pre-set elongation has been reached. Micrometer 48 serves as a means for zeroing the LVDT. Dial gage 36 and micrometer 48 are protected by cover 50.

Figure 2:
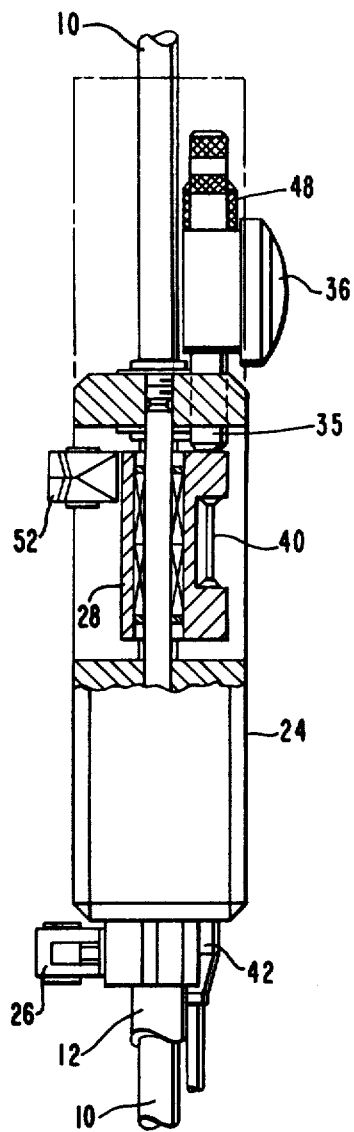
FIG. 2 is a side view of the bolt stretch measurement device of FIG. 1.

FIG. 2 is a side view of the bolt stretch measuring device of FIG. 1. Measuring rod 10 is clearly shown passing through bolt extension tube 12 and also through instrument housing 24. Clamp 52 serves as a means for securing slide assembly 28 to measuring rod 10. It would be apparent from this view that the length of measuring rod 10 is relatively unimportant, since slide assembly 28 can be fixed to measuring rod 10 by way of clamp 52 at any point. This provides a substantial improvement over prior bolt stretch measurement devices wherein the length of the measuring rod was specific to the bolt or stud being measured. With this feature, many different sizes of bolts or studs can be measured with a single bolt stretch measuring device.

FIG. 3 is a partial cross-sectional view of a bolt being measured while simultaneously being stretched. Measuring rod 10 passes through bore 54 of bolt 56 which is being measured, and comes in contact with closure screw 58 at the bottom end of bolt 56. The point of contact between measuring rod 10 and closure screw 58 serves as a first reference point for the bolt stretch measurement. Enlarged section 14 of bolt extension tube 12 is a clearance fit in threaded segment 60 of bolt 56. Bevel 22 is in contact with the bottom edge 62 of threaded segment 60. This point of contact serves as a second reference point for the bolt stretch measurement. Bolt extension tube segments 12a and 12c serve as a wrench support and are shown extending into bore 54. Coupler 16 and enlarged section 20 are shown as being clearance fit in bore 54 and act as stabilizing sleeves, thereby preventing radial movement within bore 54, which would allow the hydraulic wrench to flop around as pressure is alternately applied and released to operate the hydraulic wrench ratchet. This wrench motion would disturb the measurement device if such a support or stabilizing sleeve was not used. Socket 64 attached to arm 66 of a wrench mechanism which serves as a means for turning nut 68 and putting tension on bolt 56. Both extension tube 12 and measurement rod 10 extend through a bore 70 in arm 66, socket 64 and nut 68.

While the invention has been illustrated by a preferred embodiment, it should be understood that in the broadest aspects of the invention, certain changes may be made of the omission of unwanted parts, by the addition of parts, or by the substitution of equivalents without departing from the scope of the invention.

What is claimed is:

1. A device for measuring elongation of a tensile member having an axial bore, said device comprising:
    an extension tube extending into said bore;
    a measuring rod having a length which is independent of the length of the tensile member being measured and extending through said extension tube and into said bore;
    said measuring rod and said extension tube being movable relative to each other and each contacting a point along said bore at longitudinally spaced locations, wherein the distance between said points changes as the length of said tensile member changes;
    a slide assembly slidably disposed along and having an opening through which said measuring rod passes and being capable of being secured to said measuring rod;
    means for securing said slide assembly to said measuring rod such that once said slide assembly is secured, the distance between said slide assembly and the point of fixation of said measuring rod along said bore, is constant; and
    means for measuring a change in longitudinal displacement between said slide assembly and one end of said extension tube, wherein the change in said displacement is proportional to elongation of said tensile member.

2. A device as recited in claim 1, further comprising: means for preventing radial movement of said extension tube within said bore.

3. A device as recited in claim 1, wherein said means for measuring longitudinal displacement is a dial gauge.

4. A device as recited in claim 1, wherein said means for measuring longitudinal displacement comprises:
a linear variable differential transformer; and
a signal processor for receiving signals from said transformer and for displaying said displacement.

5. A device as recited in claim 4, further comprising: means for zeroing the output of said means for measuring longitudinal displacement.

6. A device as recited in claim 5, wherein said means for zeroing includes:
an operating rod attached to said linear variable differential transformer; and
a micrometer for adjusting the position of said operating rod.

7. A device as recited in claim 1, further comprising an instrument housing attached to said extension tube, wherein said means for measuring longitudinal displacement measures displacement between said slide assembly and said instrument housing.

8. An appartus for stressing a tensile member having an axial bore to a preselected stress, said apparatus including:
an extension tube extending into said bore;
a measuring rod having a length which is independent of the length of the tensile member being stressed and extending through said extension tube and into said bore;
said measuring rod and said extension tube being movable relative to each other and each contacting a point along said bore at longitudinally spaced locations, wherein the distance between said points changes as the length of said tensile member changes;
a slide assembly having an opening through which said measuring rod passes and being capable of being secured to said measuring rod;
means for securing said slide assembly to said measuring rod such that once said slide assembly is secured, the distance between said slide assembly and the point of fixation of said measuring rod along said bore, is constant;
means for measuring a change in longitudinal displacement between said slide assembly and one end of said extension tube and for producing a signal in response to said displacement, wherein the change in said displacement is proportional to the elongation of said tensile member;
means for applying tensile stress to said tensile member in response to said signal.

9. An apparatus as recited in claim 8, wherein said means for measuring longitudinal displacement and for producing a signal includes:
a linear variable differential transformer; and
a signal processor for producing said signal in response to said linear variable differential transformer.

10. An apparatus as recited in claim 8, wherein said means for applying tensile stress is a hydraulic wrench.

11. An apparatus as recited in claim 8, wherein said means for measuring further comprises:
means for pre-setting a desired bolt elongation; and
means for stopping said means for applying tensile stress when said pre-set elongation is reached.

* * * * *